US011644863B2

(12) United States Patent
Na et al.

(10) Patent No.: US 11,644,863 B2
(45) Date of Patent: May 9, 2023

(54) ELECTRONIC DEVICE

(71) Applicant: Lenovo (Beijing) Limited, Beijing (CN)

(72) Inventors: Zhigang Na, Beijing (CN); Dehong Meng, Beijing (CN); Shuhui Cai, Beijing (CN); Jinshan Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/473,086

(22) Filed: Sep. 13, 2021

(65) Prior Publication Data
US 2022/0100225 A1 Mar. 31, 2022

(30) Foreign Application Priority Data

Sep. 30, 2020 (CN) .......................... 202011063055.9

(51) Int. Cl.
*G06F 1/16* (2006.01)
*F16M 11/10* (2006.01)
*F16M 11/20* (2006.01)

(52) U.S. Cl.
CPC ......... *G06F 1/1601* (2013.01); *F16M 11/105* (2013.01); *F16M 11/2021* (2013.01); *F16M 11/2028* (2013.01); *G06F 1/1622* (2013.01); *G06F 1/1679* (2013.01)

(58) Field of Classification Search
CPC .... G06F 1/1622; G06F 1/1601; G06F 1/1679; F16M 11/105; F16M 11/2028; F16M 11/2021
See application file for complete search history.

(56) References Cited

U.S. PATENT DOCUMENTS

| 6,437,975 B1 * | 8/2002 | Huang | F16M 11/105 |
| | | | 361/825 |
| 6,517,040 B1 * | 2/2003 | Wen | F16M 11/2064 |
| | | | 248/920 |
| 6,639,788 B1 * | 10/2003 | Liao | G06F 1/1601 |
| | | | 361/679.22 |

(Continued)

FOREIGN PATENT DOCUMENTS

| CN | 204960057 U | 1/2016 |
| CN | 205490754 U | 8/2016 |

(Continued)

*Primary Examiner* — Nidhi Thaker
(74) *Attorney, Agent, or Firm* — Anova Law Group, PLLC

(57) ABSTRACT

An electronic device includes a first body, a second body, a connection device, and a bearing mechanism. The first body includes a support plane. The connection device is arranged at the support plane and is configured to connect the first body and the second body. The bearing mechanism is arranged at the first body. The connection device includes a plurality of connection members between the first body and the second body, and the second body rotates on the support plane through movements and rotations of the connection members in a plurality of slideways located on the support plane. The bearing mechanism is connected with the connection members and drives the connection members to move on the support plane to bear gravity of the second body.

8 Claims, 19 Drawing Sheets

(56) References Cited

U.S. PATENT DOCUMENTS

| | | | | |
|---|---|---|---|---|
| 7,082,028 B2* | 7/2006 | Huilgol | G06F 1/1637 | 248/125.1 |
| 7,835,145 B2* | 11/2010 | Chiang | G06F 1/1616 | 248/922 |
| 8,200,296 B2* | 6/2012 | Arakane | G06F 1/1616 | 455/566 |
| 8,811,034 B2* | 8/2014 | Lee | G06F 1/1616 | 361/755 |
| 9,304,541 B2* | 4/2016 | Chuang | G06F 1/1622 | |
| 9,528,653 B1* | 12/2016 | Hsu | F16M 11/105 | |
| 10,627,854 B2* | 4/2020 | Gurr | F16H 19/001 | |
| 10,860,066 B1* | 12/2020 | Barnard | F16M 11/041 | |
| 11,284,526 B2* | 3/2022 | Kim | H04M 1/0212 | |
| 11,350,536 B2* | 5/2022 | Choi | F16M 11/42 | |
| 11,378,225 B2* | 7/2022 | Laurent | F16M 11/105 | |
| 2003/0075646 A1* | 4/2003 | Womack | H02G 3/30 | 248/49 |
| 2007/0076358 A1* | 4/2007 | Hsu | G06F 1/16 | 361/679.33 |
| 2007/0084621 A1* | 4/2007 | Martin | G06F 1/1603 | 174/97 |
| 2007/0084625 A1* | 4/2007 | Martin | H02G 3/04 | 174/135 |
| 2007/0086153 A1* | 4/2007 | Martin | G06F 1/1601 | 361/679.22 |
| 2008/0236858 A1* | 10/2008 | Quijano | G06F 1/181 | 174/50 |
| 2009/0183341 A1* | 7/2009 | Chuan | G06F 1/1679 | 16/358 |
| 2009/0262493 A1* | 10/2009 | Lee | G06F 1/1601 | 361/679.21 |
| 2009/0273890 A1* | 11/2009 | Takagi | H04M 1/0247 | 361/679.01 |
| 2009/0296337 A1* | 12/2009 | Chou | G06F 1/1601 | 361/679.28 |
| 2015/0211675 A1* | 7/2015 | Shyu | F16M 11/105 | 248/125.7 |
| 2022/0100228 A1* | 3/2022 | Chen | G06F 1/1601 | |

FOREIGN PATENT DOCUMENTS

| | | | |
|---|---|---|---|
| CN | 111425715 A | * | 7/2020 |
| CN | 111425715 A | | 7/2020 |

* cited by examiner

ELECTRONIC DEVICE

CROSS-REFERENCE TO RELATED APPLICATION

This application claim priority to Chinese Patent Application No. CN 202011063055.9, filed on Sep. 30, 2020, the entire content of which is incorporated herein by reference.

TECHNICAL FIELD

The present disclosure relates to the technical field of electronic device and, more particularly, to an electronic device.

BACKGROUND

At present, electronic devices such as displays and all-in-one computers usually have a single use orientation, which cannot meet more diversified needs of different users.

SUMMARY

In accordance with the disclosure, there is provided an electronic device including a first body, a second body, a connection device, and a bearing mechanism. The first body includes a support plane. The connection device is arranged at the support plane and is configured to connect the first body and the second body. The bearing mechanism is arranged at the first body. The connection device includes a plurality of connection members between the first body and the second body, and the second body rotates on the support plane through movements and rotations of the connection members in a plurality of slideways located on the support plane. The bearing mechanism is connected with the connection members and drives the connection members to move on the support plane to bear gravity of the second body.

BRIEF DESCRIPTION OF THE DRAWINGS

In order to explain the embodiments of the present disclosure more clearly, reference is made to the accompanying drawings, which are used in the description of the embodiments or the existing technology. Obviously, the drawings in the following description are only embodiments of the present disclosure, and other drawings can be obtained from these drawings without any inventive effort for those of ordinary skill in the art.

In FIGS. 1-19: First body 1, Second body 2, Connection device 3, First strip hole 4, Second strip hole 5, Third strip hole 6, First connection member 7, Second connection member 8, Third connection member 9, Swing member 10, First end 11, Second end 12, Sliding rail 13, Sliding member 14, First elastic member 15, Housing 16, Lock member 17, Second elastic member 18, Mounting member 19, Operation member 20, Transmission member 21, Wire member 22, Threading port 23, Support plate 24, Base 25, Gasket 26, Bevel 27, Wire 28, Display surface 29.

DETAILED DESCRIPTION OF THE EMBODIMENTS

The present disclosure provides an electronic device that has more use orientations, which can meet more diversified use needs of users, and can also improve use performance of the electronic device.

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

Figure 1:
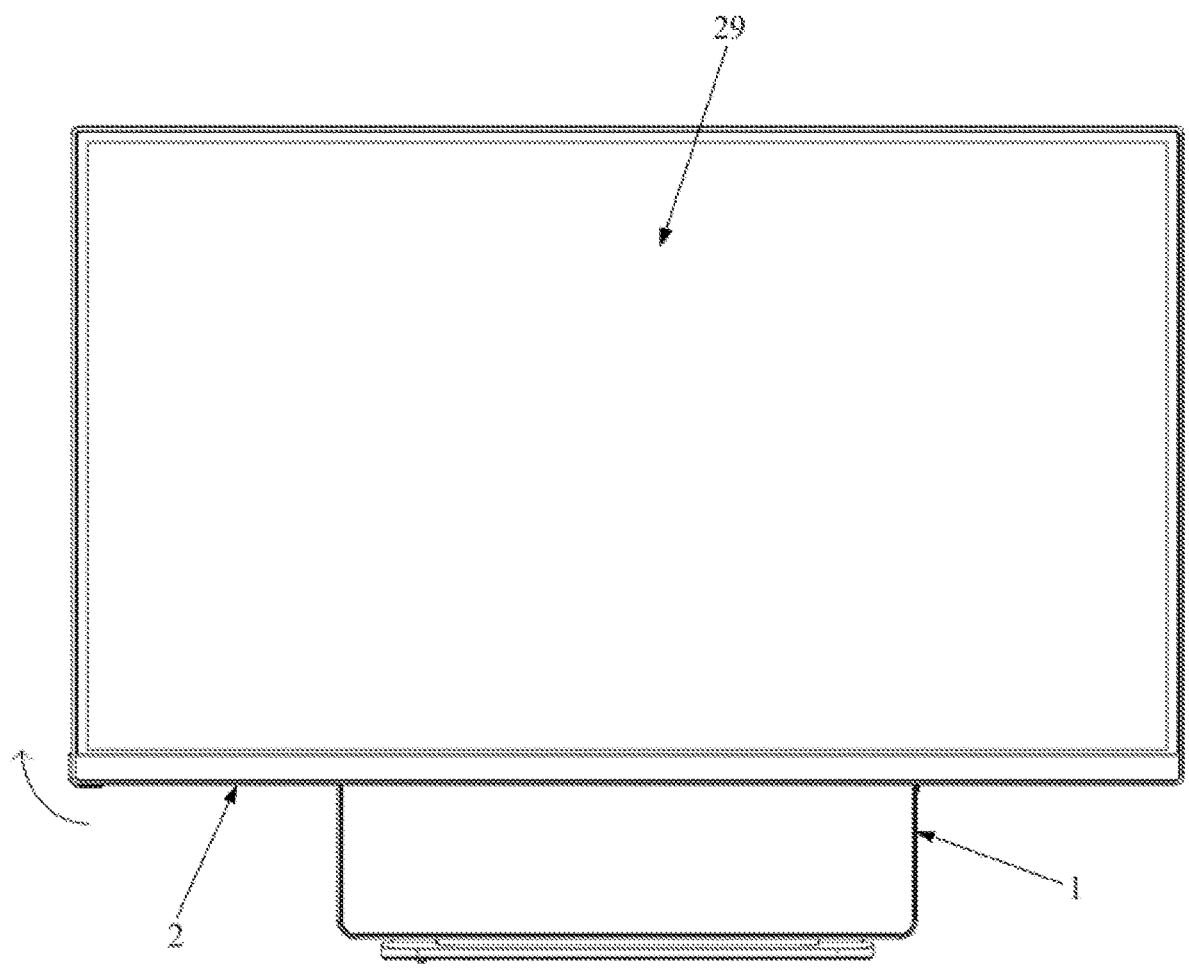
FIG. 1 is a schematic structural diagram showing an electronic device in a second direction when in a landscape orientation according to an embodiment of the present disclosure.

As shown in FIGS. 1-19, the embodiments of the present disclosure provide an electronic device, which mainly refers to an electronic device that is supported for use, such as a display, an all-in-one computer, etc. The electronic device mainly includes a first body 1, a second body 2, a connection device 3, and a bearing mechanism. The first body 1 can at least have a support function, that is, can at least support the second body 2 so that the second body 2 has a normal use mode. The first body 1 has a support plane that can be an external surface of the first body 1. The second body 2 may be a device provided with an input/output device (the input/output device refers to a device with input and/or output functions, such as a display screen capable of outputting image information, a touch screen capable of outputting image information and inputting information by touch, etc.), which is mainly used to realize information interaction with the user. The connection device 3 is a device specifically configured to connect the first body 1 and the second body 2, which is arranged at the support plane, so that the second body 2 is connected to the support plane of the first body 1. Through connection of the connection device 3, there are multiple connection members between the first body 1 and the second body 2, and there are multiple slideways on the support plane (the slideways are also part of the connection device 3). Through movement and rotation of the connection members in the slideway located on the support plane, rotation of the second body 2 on the support plane is realized, that is, a plane rotation of the second body 2 relative to the first body 1 is realized through the connection device 3, and use orientation of the electronic device can be changed through this type of rotation. For example, when the first body 1 is a support structure and the second body 2 is a display, the display on the support structure can be transformed from a landscape orientation to a portrait orientation by the plane rotation (the entire display has a rectangular shape, or at least a display surface 29 of the display is rectangular, and the landscape orientation refers to an orientation when a long side of the display surface 29 is set horizontally, as shown in FIG. 1, the portrait orientation refers to an orientation when the long side of the display surface 29 is set vertically, as shown in FIG. 4). The bearing mechanism is arranged at the first body 1 and connected with the connection member. When the connection member moves on the support plane, the bearing mechanism can drive the connection member to move. Since the connection member is connected to the second body 2, the bearing mechanism can bear gravity of the second body 2 during the rotation process by driving the connection member, which prevents the gravity from directly acting on the slideway matched with the connection member, thereby avoiding the connection member and the slideway being stuck or jammed during relative sliding, which will affect normal rotation of the second body 2.

In the electronic device described above, the plane rotation of the second body 2 relative to the first body 1 is realized by making the second body 2 rotate relative to the first body 1 on the support plane, so that a transformation of the use orientation of the electronic device can be realized, such as transforming from the landscape orientation to the portrait orientation, or transforming from the portrait orientation to the landscape orientation, and thereby more diversified use needs of the users can be met. Also, in the process of orientation transformation, the bearing mechanism bears the gravity of the second body 2 during the rotation process by driving the connection member, so that the orientation transformation of the electronic device can be realized more smoothly and steadily, which improves use performance of the electronic device.

Figure 2:
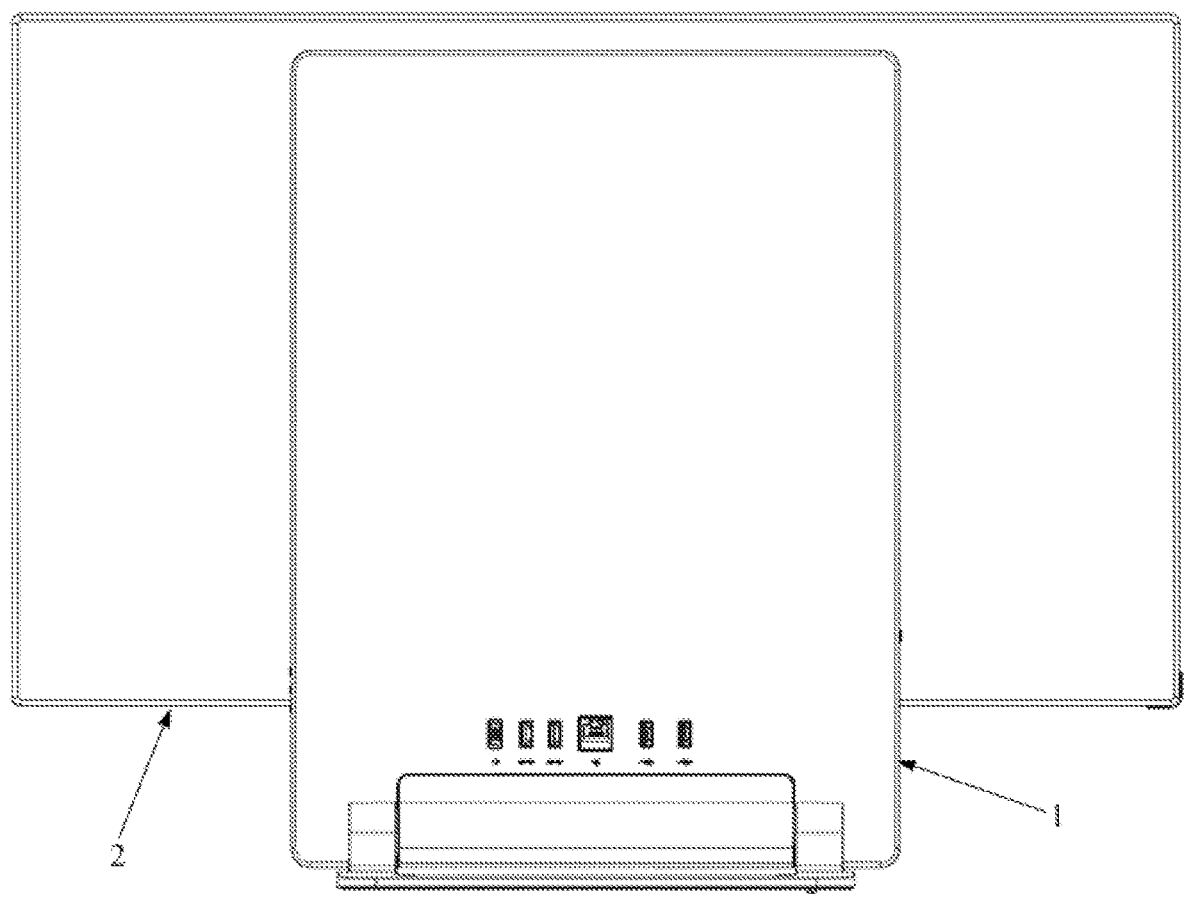
FIG. 2 is a schematic structural diagram showing an electronic device in a first direction when in a landscape orientation.
Figure 3:
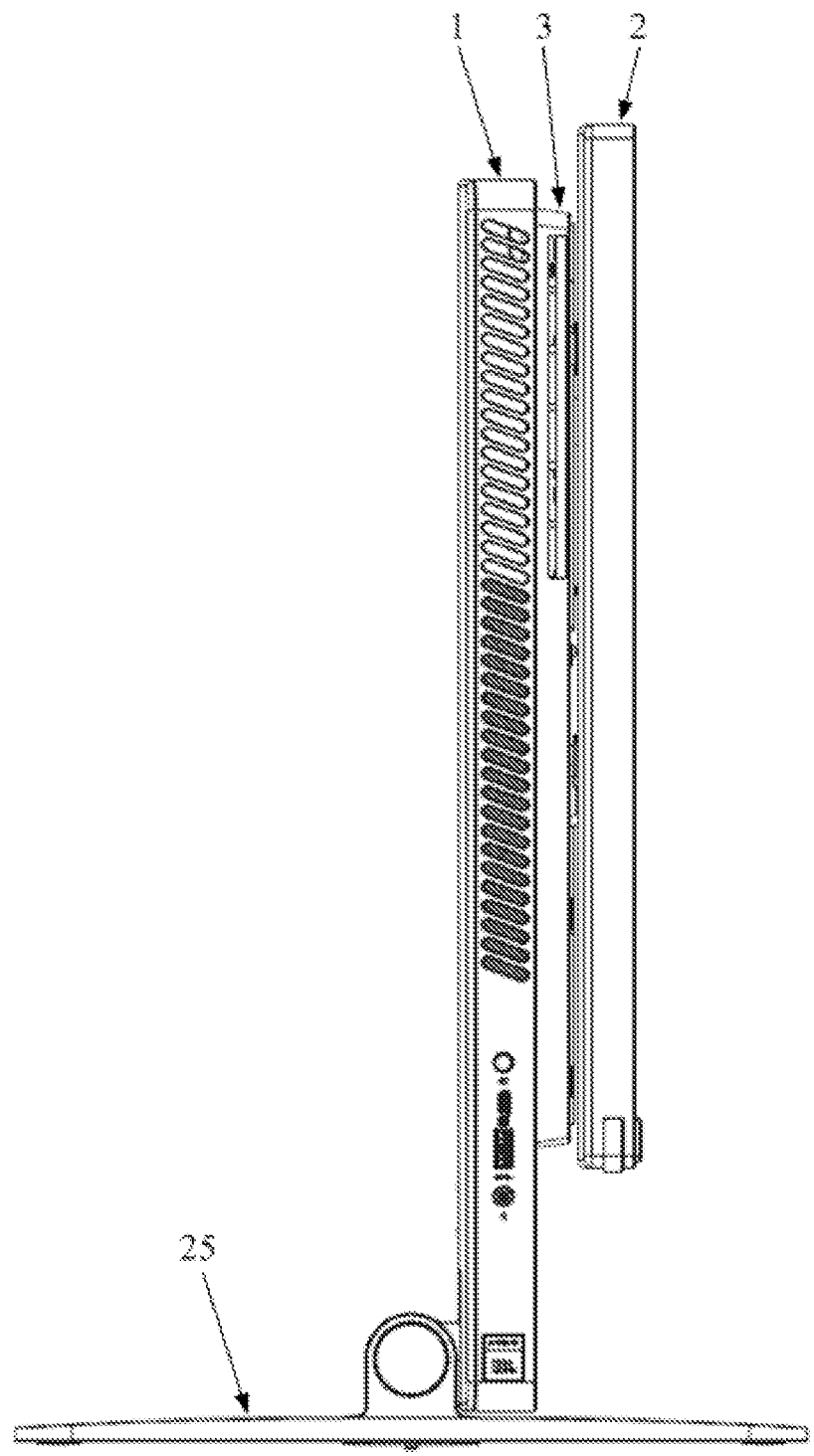
FIG. 3 is a side view showing an electronic device when in a landscape orientation.
Figure 4:
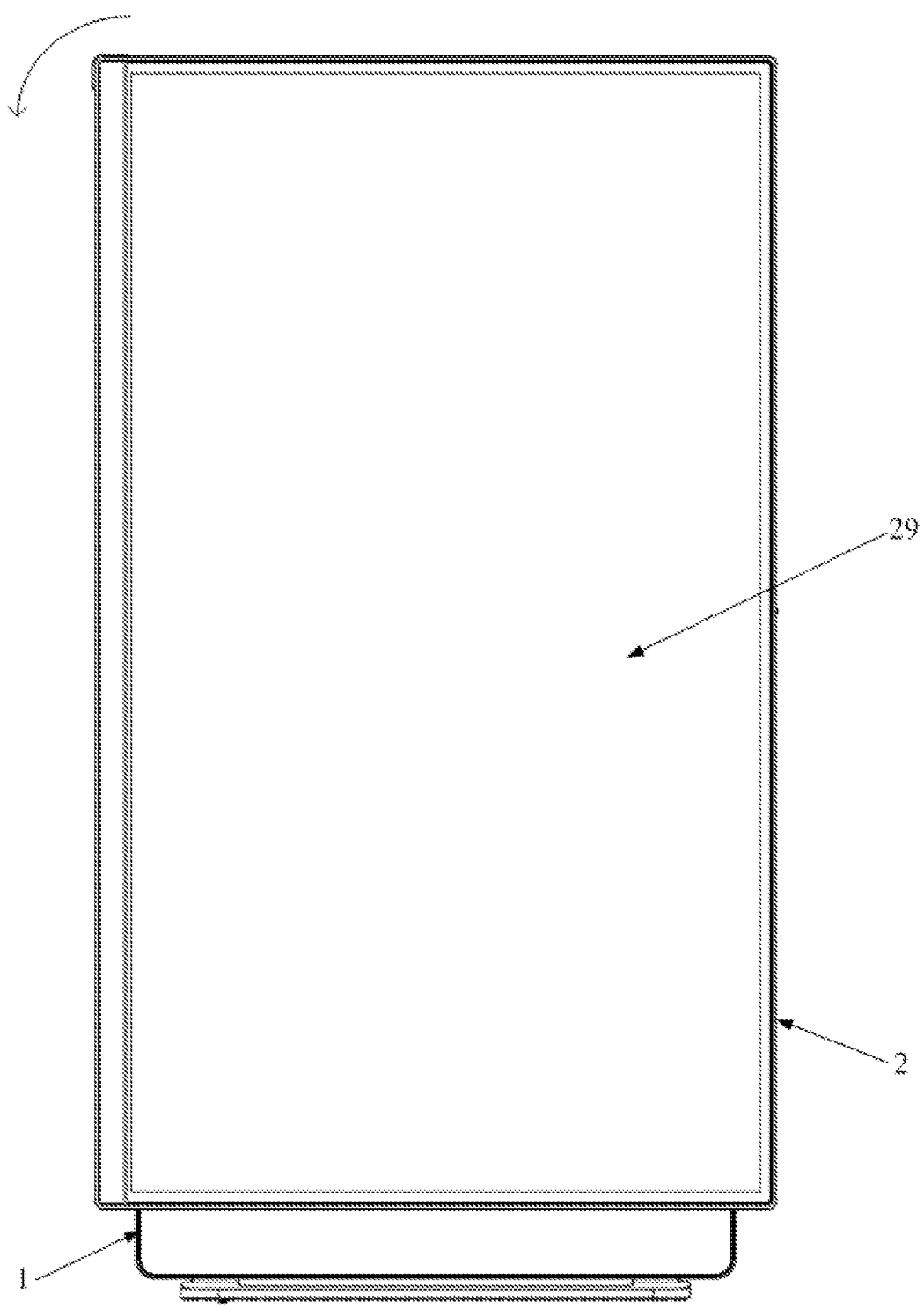
FIG. 4 is a schematic structural diagram showing an electronic device in a second direction when in a portrait orientation.
Figure 5:
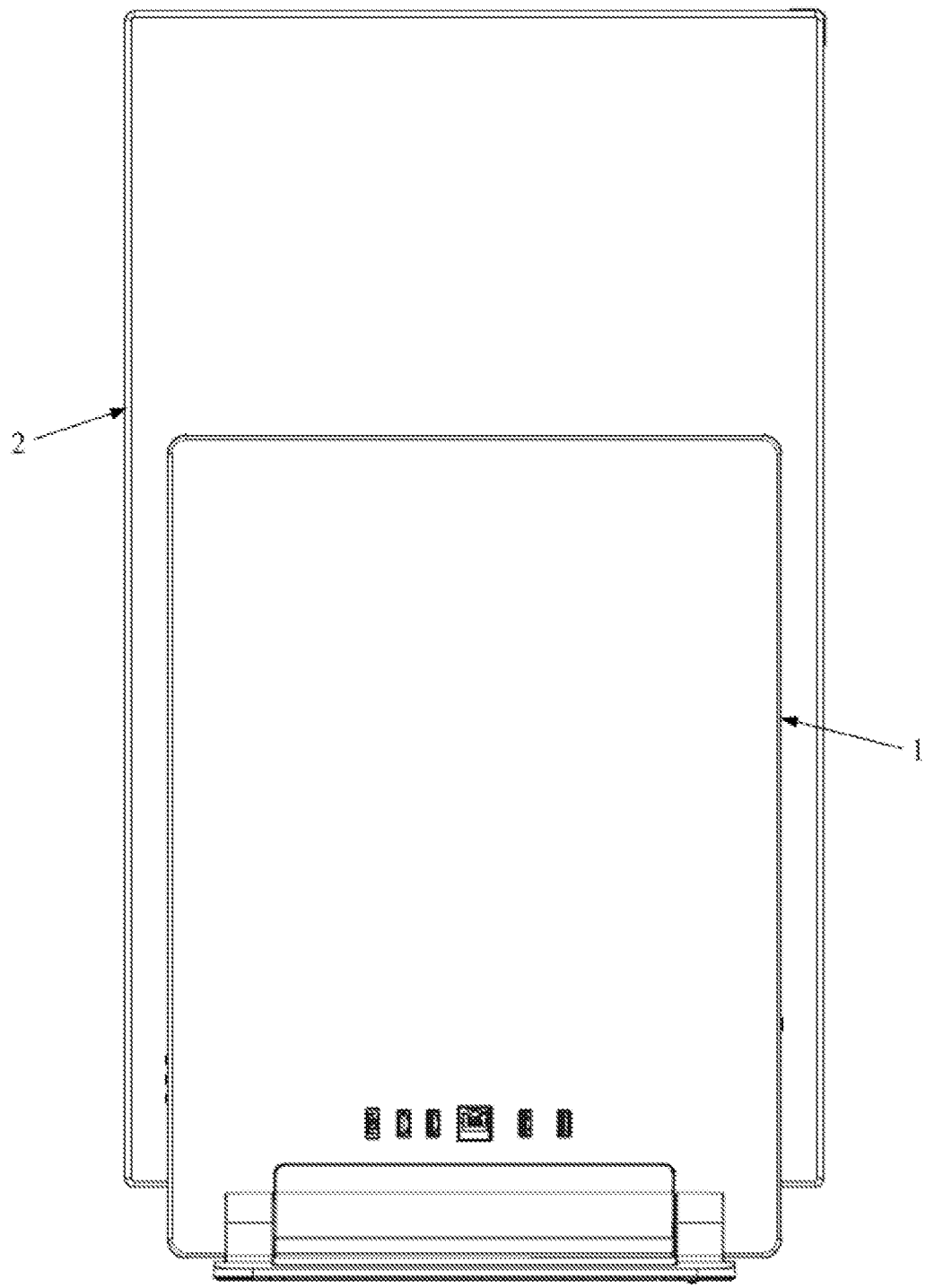
FIG. 5 is a schematic structural diagram showing an electronic device in a first direction when in a portrait orientation.

According to the electronic device of the present disclosure, as shown in FIGS. 1-6, its appearance is as follows: the second body 2 is rotatably arranged at the first body 1 through the connection device 3 that is arranged between the first body 1 and the second body 2, and the connection device 3 is blocked by the first body 1 in a first direction and is blocked by the second body 2 in a second direction, where the first direction and the second direction are opposite directions. Specifically, the first direction is a direction in which the user is located behind the electronic device to view the electronic device (the electronic device seen from this perspective is shown in FIGS. 2 and 5), and the second direction is a direction in which the user is located in front of the electronic device to view the electronic device (the electronic device seen from this perspective is shown in FIGS. 1 and 4). In this type of electronic device, the first body 1 can include a host device of the electronic device, and the second body 2 can be a display, which can realize adjustment of the display orientation between the landscape orientation and the portrait orientation, and in the meanwhile, the connection device 3 can be hidden on both front and back of the electronic device, which makes the appearance of the electronic device more beautiful.

As shown in FIGS. 1 and 4, shape of the display surface 29 of the second body 2 is rectangular in the present disclosure. The shape is rectangular because the transformation between the landscape orientation and the portrait orientation can be realized if the shape of the display surface 29 is rectangular (when the shape of the display surface 29 is square, there is no distinction between the landscape orientation and the portrait orientation, since these two orientations are the same), which can ensure that the electronic devices have different orientations.

In some embodiments, the second body 2 in the landscape orientation and the second body 2 in the portrait orientation are perpendicular to each other. In the present disclosure, a variety of orientations of the electronic device caused by the rotation of the second body 2 include at least the landscape orientation and the portrait orientation. Relative positional relationship of the second body 2 in the two orientations is perpendicular to each other, that is, the second body 2 in the landscape orientation is perpendicular to the second body 2 in the portrait orientation. In the two orientations, an angle changed by the second body 2 through rotation is 90 degrees, that is, maximum angle that the second body 2 rotates relative to the first body 1 is not less than 90 degrees. When the electronic device is in the landscape orientation, the user can use the electronic device to watch banner images, do office work, etc. When the electronic device is in the portrait orientation, the user can use the electronic device to watch books, browse news web pages, edit vertical pictures, watch vertical streaming media content (such as small videos), etc.

In addition, in the landscape and portrait orientations, a center line of the display surface 29 (the center line is a line connecting midpoints of two opposite edges) coincides with a center line of the support plane, and the center line is a center line perpendicular to a desktop that carries the electronic device. Specifically, when the electronic device is in a normal placement state, that is, when the electronic device is normally placed on the desktop in a use state, the first body 1 is in a standing state, and the support plane is a vertical plane or an inclined plane with a small angle with the vertical plane. The support plane has a center line, and projection of the center line on the vertical plane is a vertical line. Similarly, the display surface 29 also has a center line. When the electronic device is in the landscape orientation, projection of a first center line of the display surface 29 (the first center line refers to a line connecting midpoints of two long sides of the rectangular display surface 29) on the vertical plane is a vertical line, and the projected vertical line of the support plane coincides with the projected first vertical line of the display surface 29. After the electronic device transforms from the landscape orientation to the portrait orientation, projection of a second center line of the display surface 29 (the second center line refers to a line connecting midpoints of two short sides of the rectangular display surface 29) on the vertical plane is also a vertical line, and the projected vertical line of the support plane coincides with the projected second vertical line of the display surface 29. That is, no matter the second body 2 is in the landscape orientation or the portrait orientation, two sides of the second body 2 are symmetrically arranged with respect to the center line of the surface. It can be simply understood as that, no matter the electronic device is in the landscape orientation or the portrait orientation, the first body 1 is located in middle part of the second body 2 in a horizontal direction, in other words, protruding areas of the display surface 29 on left and right sides of the first body 1 are equal, as shown in FIGS. 1 and 4. In this way, support stability of the electronic device is higher, and the appearance is more beautiful.

In the landscape and portrait orientations, only part of the second body 2 can be projected on the support plane, that is, the second body 2 has a larger planar volume, and it cannot be entirely projected on the support plane. The first body 1 has at least left and right protruding parts with respect to the support plane in both landscape and portrait orientations.

Figure 6:
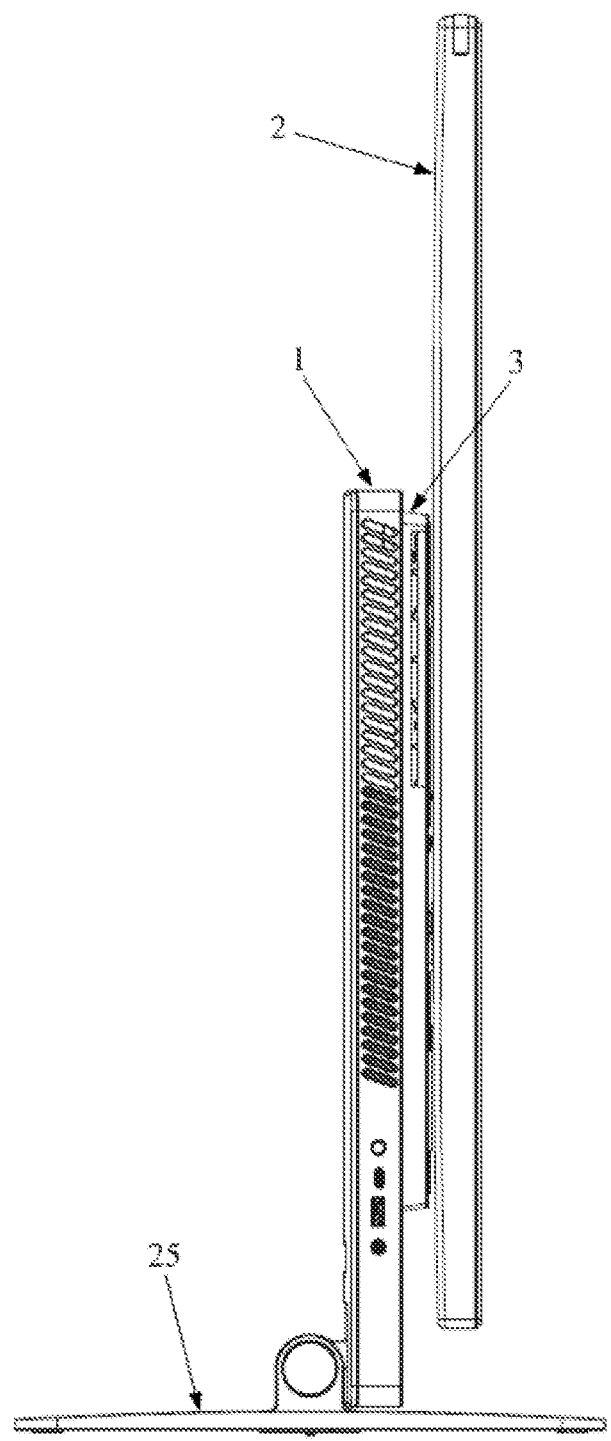
FIG. 6 is a side view showing an electronic device when in a portrait orientation.

In some embodiments, on the basis of the support function of the first body 1, the first body 1 can also have other functions. For example, when the electronic device described above is a computer, the first body 1 can be a computing device of the computer (i.e., the host device described above, in addition, the first body 1 may also include a rotatable base 25, as shown in FIGS. 3 and 6). The computing device can work and run in foreground to perform full-function computing work of the computer, or the computing device can also work and run in background, and its work content includes, for example, graphics rendering, downloading resources, etc. The second body 2 can be used as a display device of the computer. When the computing device is working and running in the foreground, the display device is used as a monitor of the computer. When the computing device is working and running in the background, the display device can be used with a laptop. The connection device 3 is configured to realize the orientation transformation of the display device, no matter the computing device is working and running in the foreground or in the background. For example, the monitor with a screen can be rotated from the landscape orientation to the portrait orientation (as shown in FIGS. 10-13), so as to meet different user needs for the screen. In the landscape orientation, the user can use the display device to watch videos, do office work, etc. In the portrait orientation, the user can use the display device to read books, browse news web pages, edit long pictures, etc.

As shown in FIGS. 7-13, the connection device 3 in the present disclosure also includes multiple slideways and multiple connection members. Numbers of the slideways and the connection members are both not less than three, and the connection members and the slideways are arranged one-to-one. In the present disclosure, the connection member with a rod shape is arranged perpendicular to the support plane. One end of the connection member is rotatably connected or fixedly connected with a side of the second body 2 close to the first body 1 (when the connection member is rotatably connected with the second body 2, the connection member can only rotate around its own axis, but cannot change its position relative to the second body 2, and the connection member rotates within the slideway in the same way), and another end of the connection member extends into the slideway and is connected to the slideway, which can move and rotate within the slideway. When the connection member is matched with the slideway, the multiple connection members and the multiple slideways are arranged one-to-one, that is, only one connection member moves and rotates within each slideway, and the numbers of the slideways and the connection members are both not less than three, such as three. Such numbers of the slideways and the connection members are provided because the more the slideways and the connection members are provided, the more uniform a force of the first body 1 is, the stronger a connection between the second body 2 and the first body 1 is, and more stable the rotation of the second body 2 is. Further, there are three slideways and three connection members in some embodiments, because cooperation of the three groups of structures makes the second body 2 and the first body 1 have three connection points on the support plane. This three-point support and connection method is more stable, and can better avoid shaking of the second body 2 relative to the first body 1, which not only improves connection stability of the first body 1 and the second body 2, but also improves rotation stability of the second body 2. Further, on the basis that there are no less than three connection points, distance between these connection points is increased as much as possible, that is, a distribution area of the connection points on the support plane is increased as much as possible, which can further improve the connection stability and rotation stability of the second body 2.

In some embodiments, as shown in FIGS. 7-13, the slideways are strip holes on the support plane, and includes a first strip hole 4, a second strip hole 5, and a third strip hole 6. The connection member includes a first connection member 7, a second connection member 8, and a third connection member 9 that are respectively rotatably and movably arranged within the first strip hole 4, the second strip hole 5, and the third strip hole 6. The first strip hole 4 and the second strip hole 5 are both arc holes with arc extension trajectory. The first strip hole 4 and the second strip hole 5 extend in different directions on the support plane, and the extension trajectory of the first strip hole 4 is an arc convex in opposite direction of gravity. The third strip hole 6 is a straight hole with a straight extension trajectory, and the third strip hole 6 is located between the first strip hole 4 and the second strip hole 5. In this structure, the slideways are the strip holes because the strip holes are easy to process and shape, and can better guide and restrain the connection members located inside, so that the connection members can move on the support plane more accurately and efficiently according to predetermined trajectory (i.e., trajectory formed by the extension of the strip holes). In some other embodiments, the slideways can also be of other structures, such as sliding grooves, sliding rails, etc. The first strip hole 4 and the second strip hole 5 are arc holes with different extension directions, so that movement trajectory of the connection members can be arc with longer movement stroke and larger movement range, which further improves the rotation stability of the second body 2. Meanwhile, the first strip hole 4 is an arc hole convex in opposite direction of gravity (that is, heights of two ends of the arc extension trajectory of this strip hole are smaller than height of middle) to cooperate with a swing member 10, so that the first connection member 7 swinging within the first strip hole 4 can have a displacement in direction of gravity, and thereby a first bearing mechanism can bear the gravity of the second body 2. The extension trajectory of the third strip hole 6 is a straight line and is located between the first strip hole 4 and the second strip hole 5, so that the third strip hole 6 can cooperate with the first strip hole 4 and the second strip hole 5 to ensure the normal rotation of the second body 2. Specifically, during the transformation of the second body 2 from the landscape orientation to the portrait orientation (as shown in FIGS. 10-13) and the transforming from the portrait orientation to the landscape orientation, the first connection member 7 in the first strip hole 4 and the second connection member 8 in the second strip hole 5 only perform one-way movement.

Figure 13:
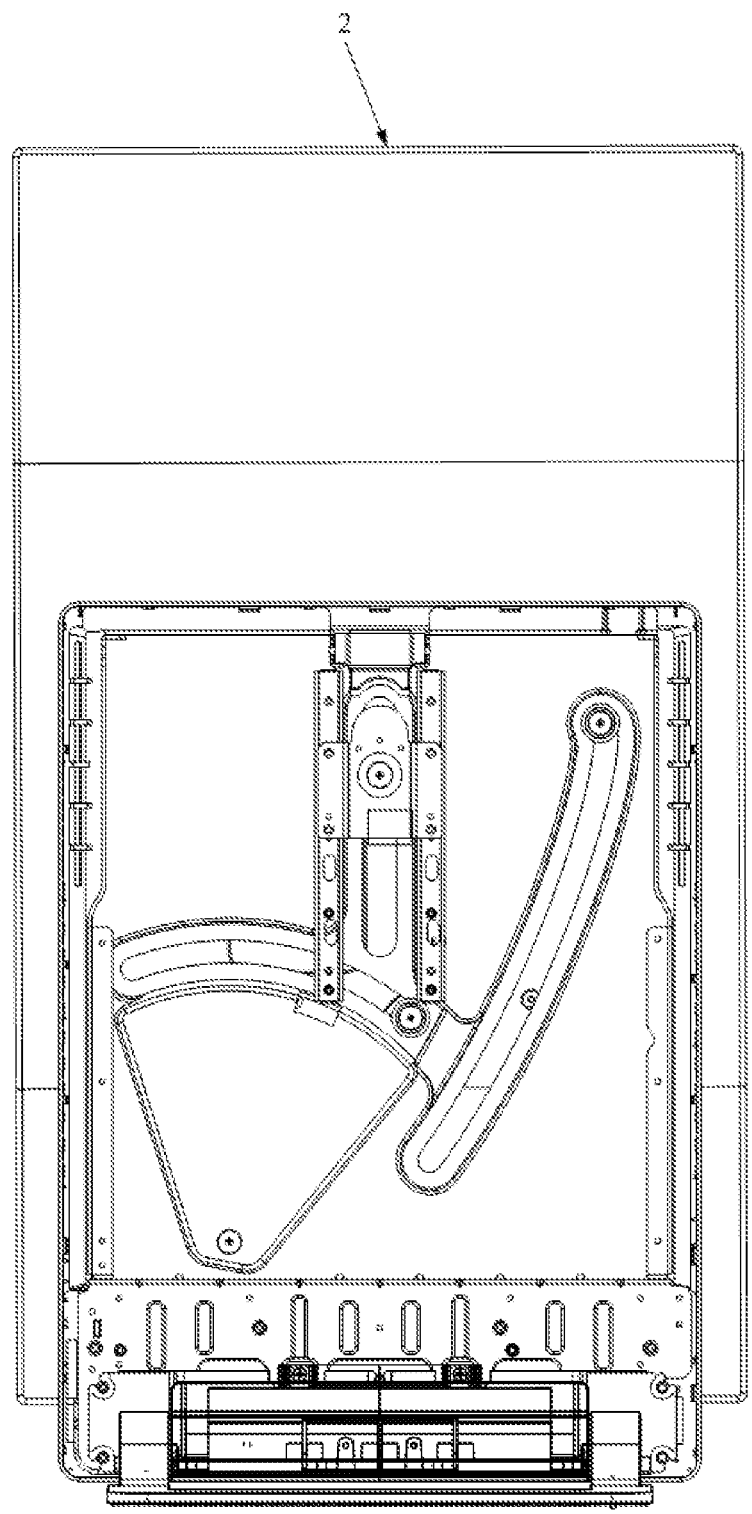
FIG. 13 is a schematic structural diagram of a portrait orientation.
Figure 14:
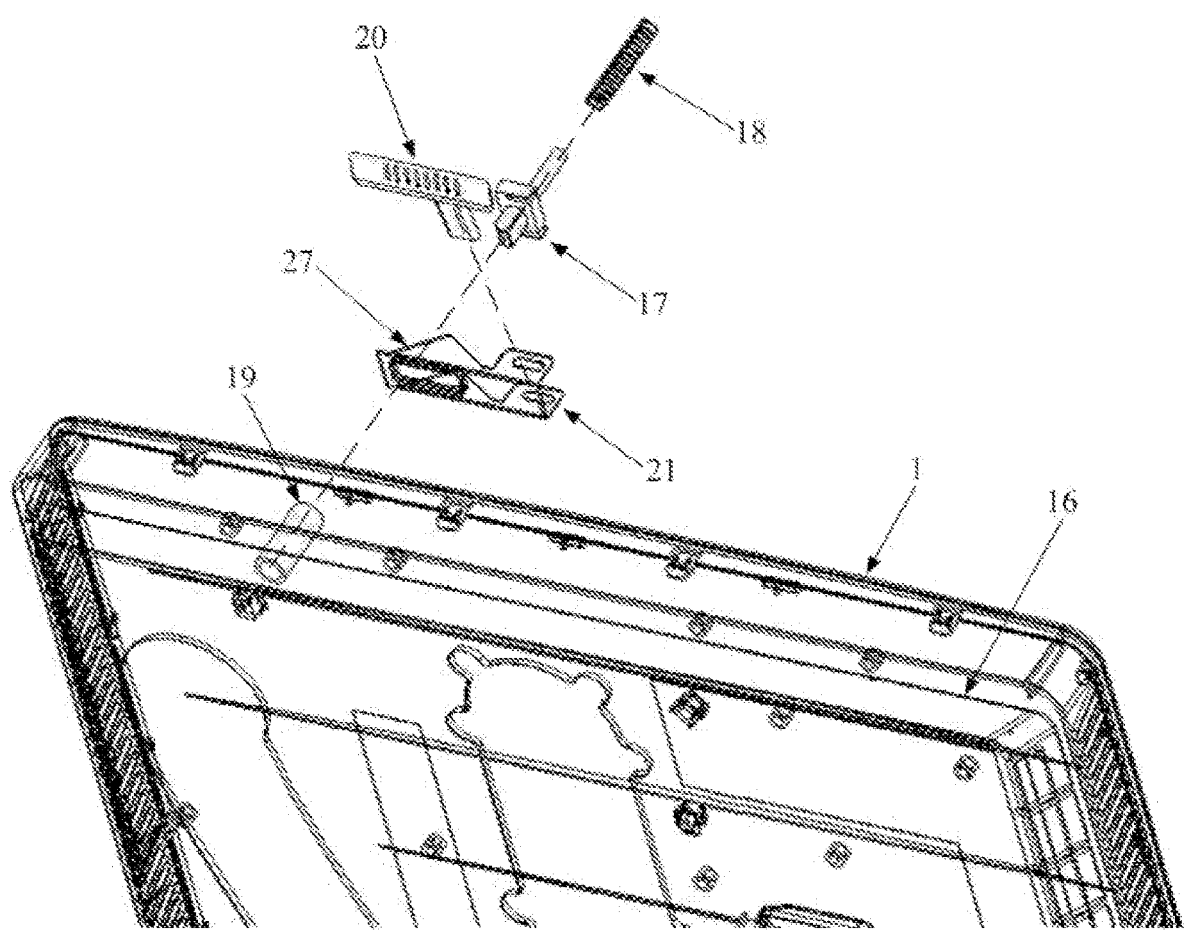
FIG. 14 is an exploded view of a positioning mechanism.
Figure 15:
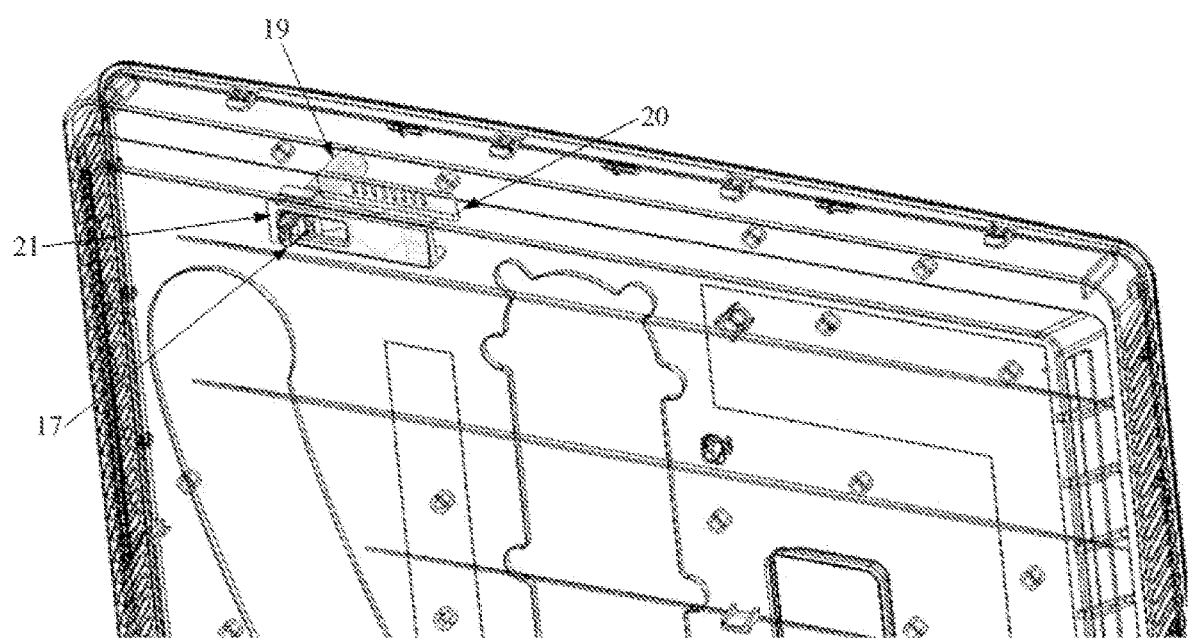
FIG. 15 is an assembly diagram of a positioning mechanism.

That is, when the second body 2 is rotated by 90 degrees, the first connection member 7 moves from one end to another end of the first strip hole 4, and the second connection member 8 also moves from one end to another end of the second strip hole 5. During the transformation from the landscape orientation to the portrait orientation, the third connection member 9 reciprocates within the third strip hole 6. That is, the third connection member 9 first moves from a bottom end to a top end of the third strip hole 6, then moves down a certain distance from the top end, and finally stays between a midpoint and the top end of the third strip hole 6, as shown in FIG. 13.

Figure 7:
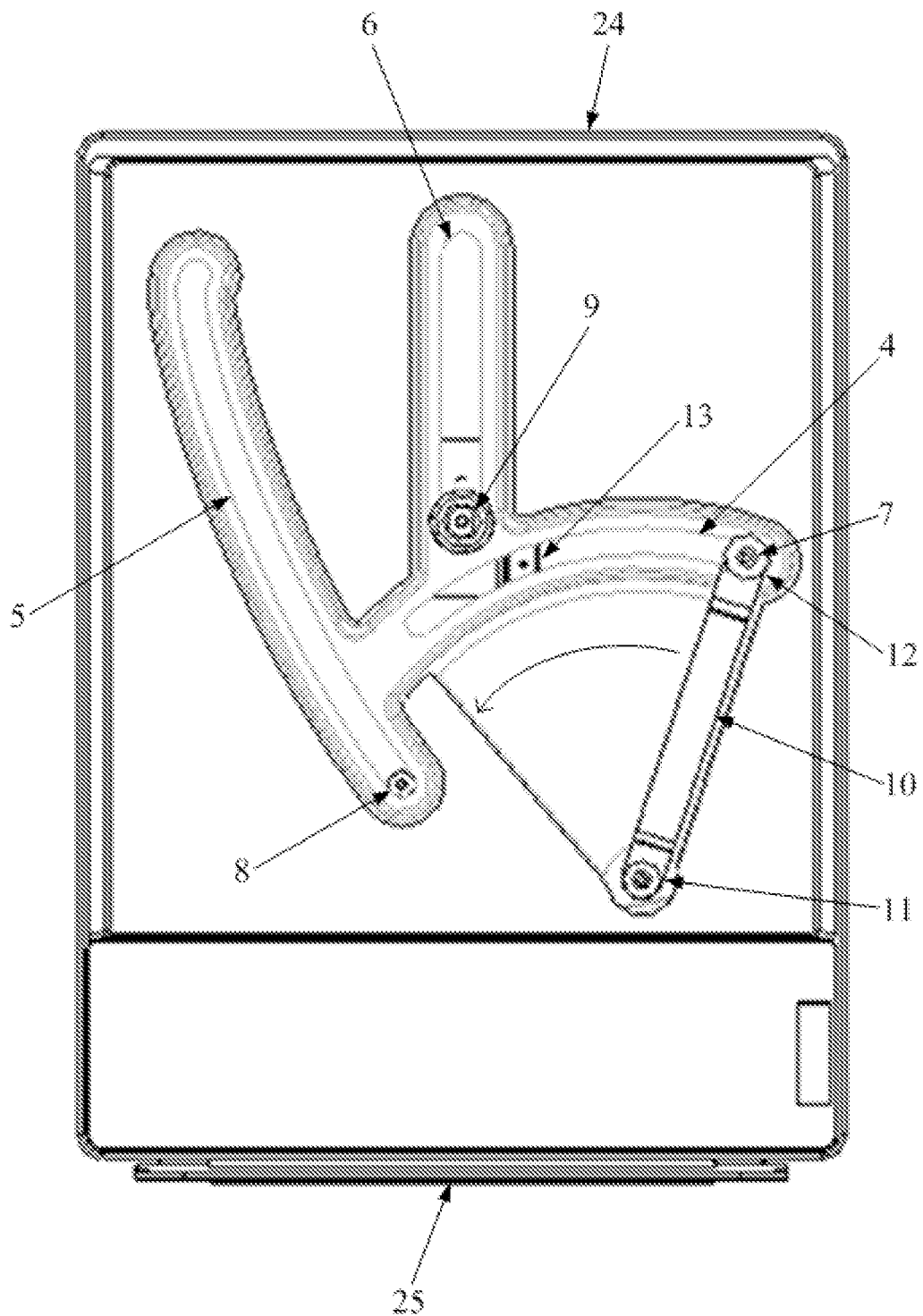
FIG. 7 is a schematic structural diagram of one side of a support plate.
Figure 8:
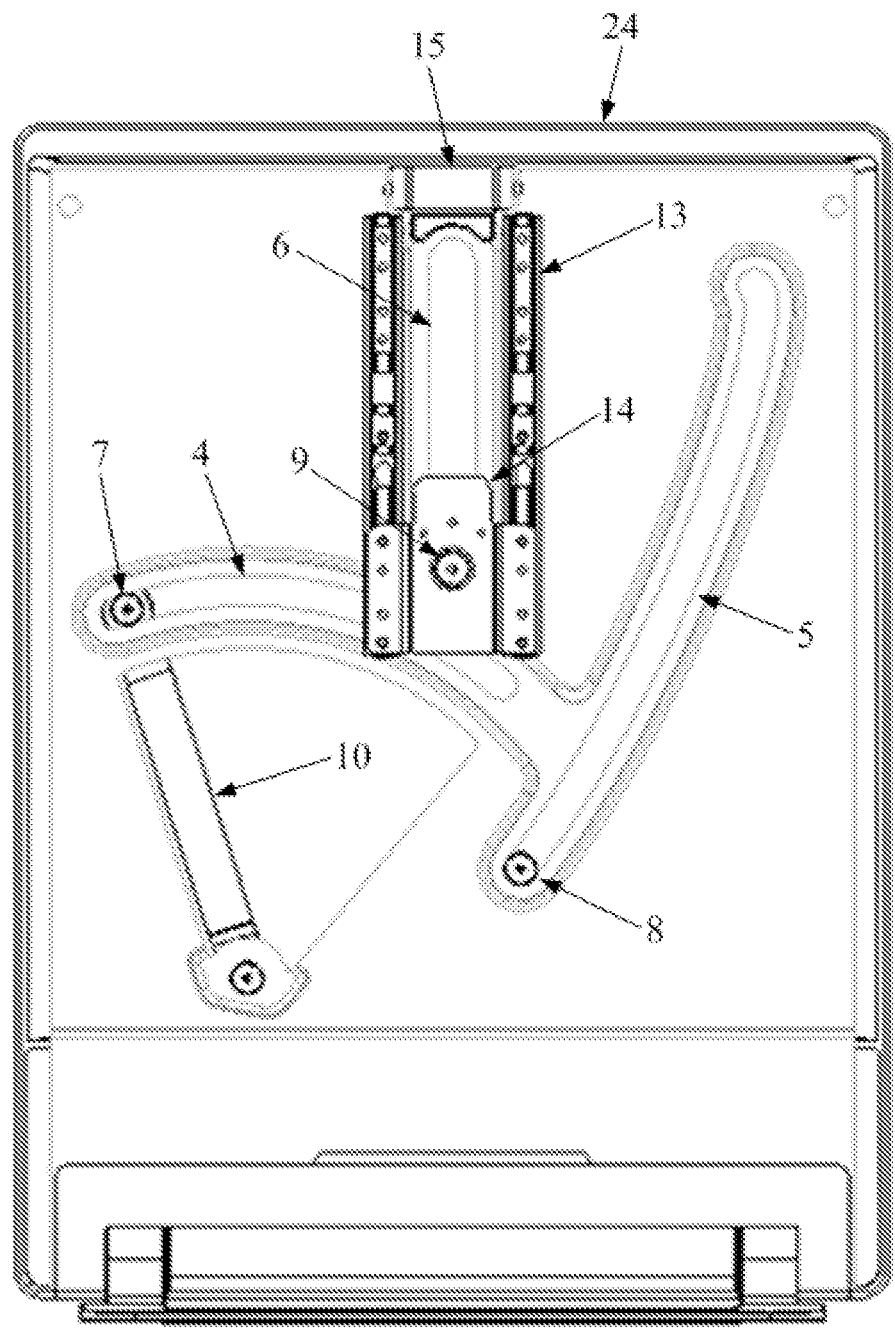
FIG. 8 is a schematic structural diagram of another side of a support plate.
Figure 9:
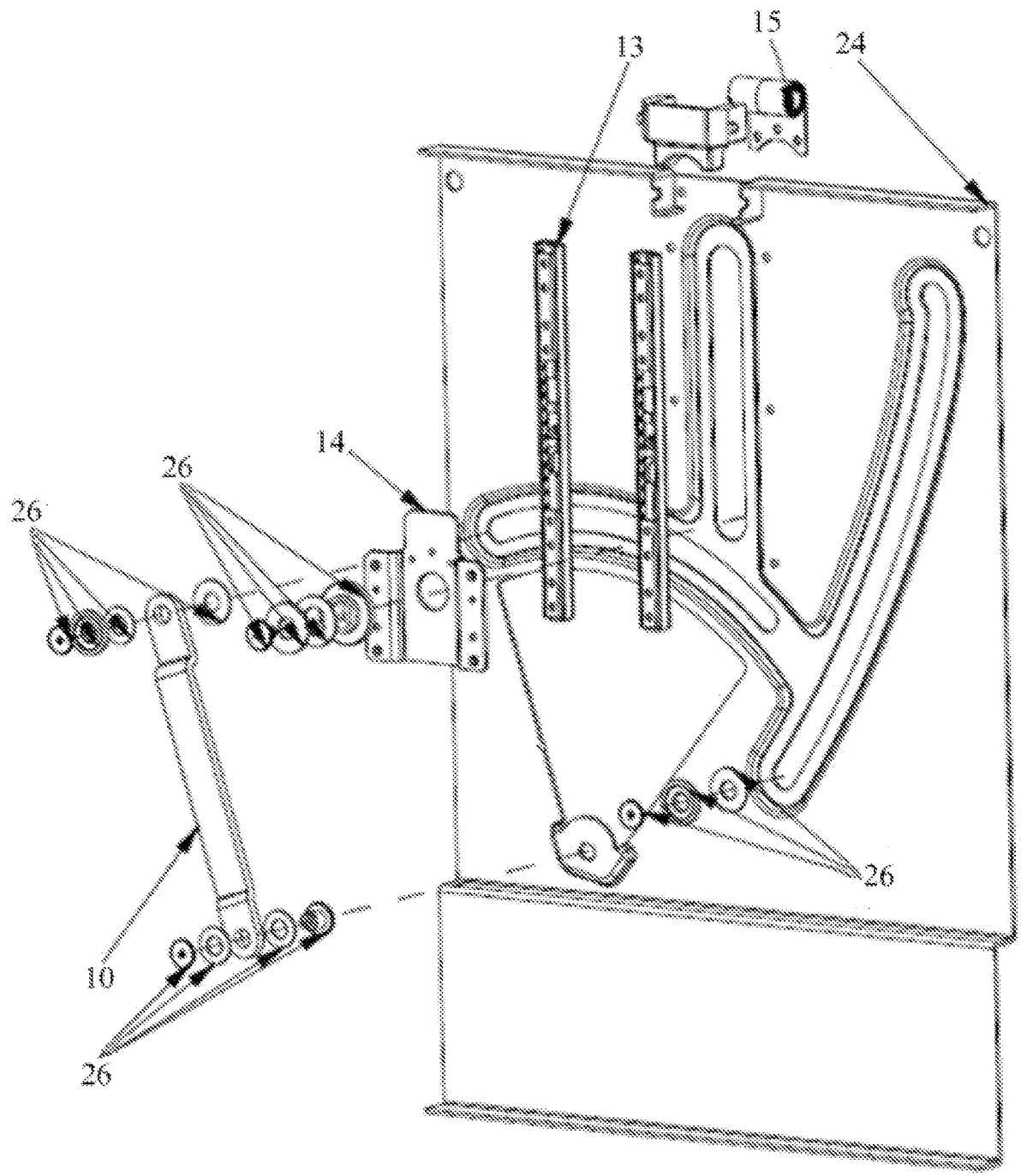
FIG. 9 is an exploded view of a first bearing mechanism and a second bearing mechanism.
Figure 10:
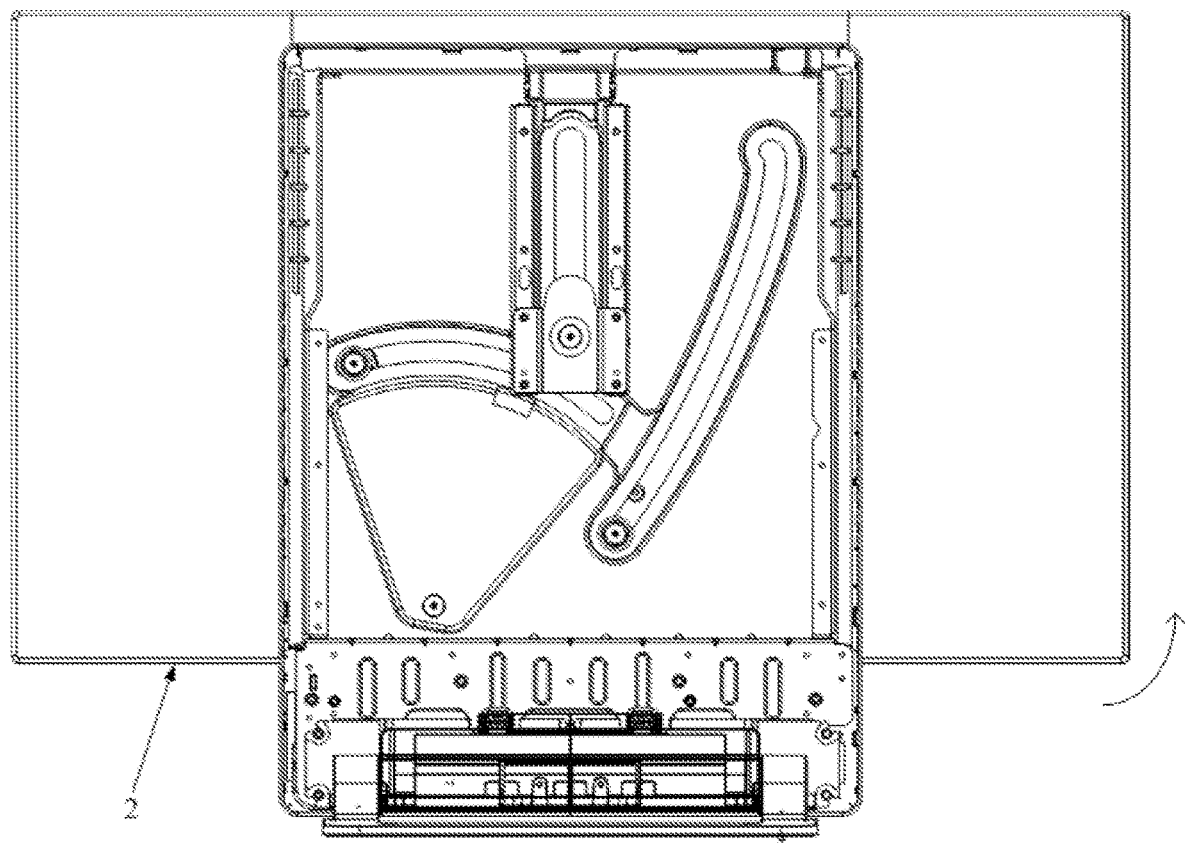
FIG. 10 is a schematic structural diagram of a landscape orientation.
Figure 11:
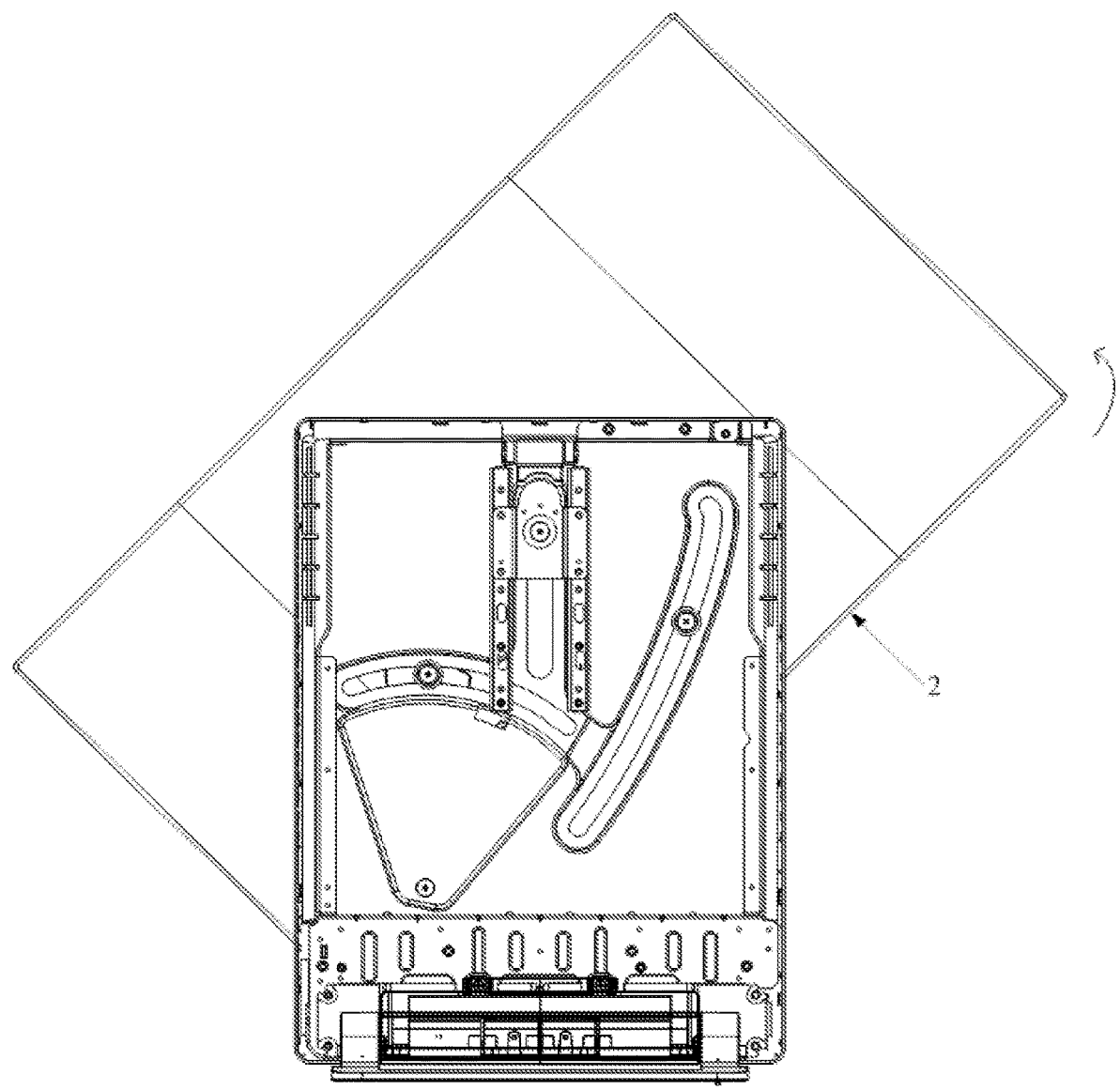
FIG. 11 is a schematic structural diagram of a second body when rotated 45 degrees during a transformation from a landscape orientation to a portrait orientation.
Figure 12:
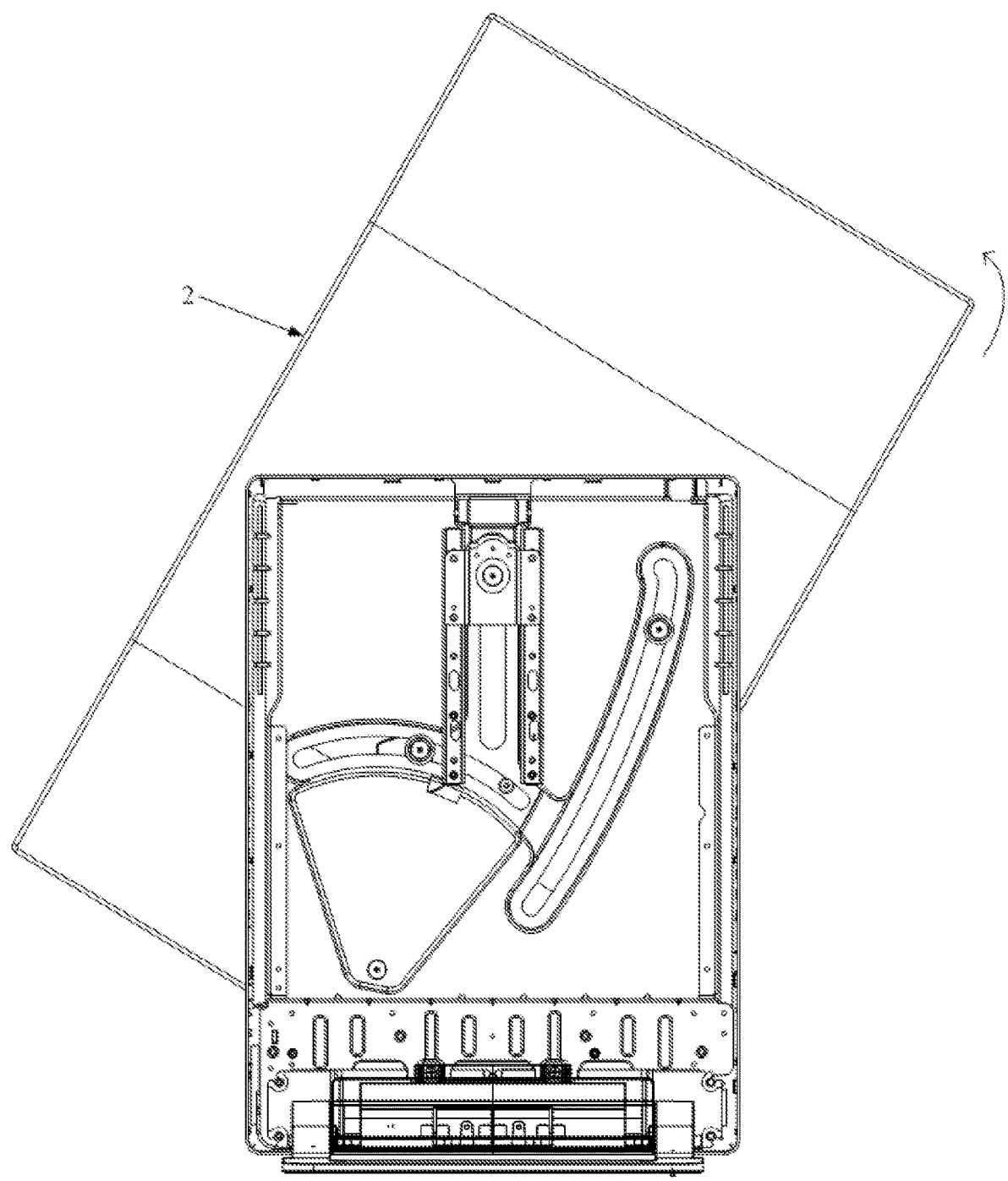
FIG. 12 is a schematic structural diagram of a second body when rotated 60 degrees during a transformation from a landscape orientation to a portrait orientation.

In the present disclosure, as shown in FIGS. 7-9, the bearing mechanism includes at least one of a first bearing mechanism and a second bearing mechanism. The first bearing mechanism is a swing mechanism that drives the connection member to swing by swinging on the support plane, and the swing connection member has a displacement in the direction of gravity. The second bearing mechanism is a sliding mechanism that drives the connection member to rise and fall in the direction of gravity by sliding on the support plane. That is, there are multiple choices for structure and number of the bearing mechanism. In order to better ensure a smooth and stable rotation of the second body 2, the bearing mechanism includes one or both of the first bearing mechanism and the second bearing mechanism. When the bearing mechanism includes the first bearing mechanism and the second bearing mechanism, the two are respectively located on two sides of a support plate 24 (the support plate 24 is described in the following content), as shown in FIGS. 7 and 8. The first bearing mechanism is a swing mechanism, and its bearing method for the second body 2 is to drive the connection member to swing during the movement of the connection member, and the swinging connection member has a displacement in the direction of gravity, that is, the swing mechanism drives the connection member to move in the direction of gravity, so as to realize bearing of the second body 2 connected with the connection member. The second bearing mechanism is a sliding mechanism, and its bearing method for the second body 2 is to drive the connection member to rise and fall in the direction of gravity during the movement of the connection member, so as to realize the bearing of the second body 2 connected with the connection member. When the bearing mechanism provided at the first body 1 includes both the first bearing mechanism and the second bearing mechanism, the two bearing mechanisms can respectively drive different connection members, so that different connection members can respectively swing with the drive of the first bearing mechanism and rise and fall with the drive of the second bearing mechanism. Therefore, these connection members all have displacement in the direction of gravity, so that the two bearing mechanisms can jointly bear the gravity of the second body 2. By providing the bearing mechanism with the structure described above, the connection member can be prevented from being affected by a shear force of the slideway, so that the second body 2 can rotate more smoothly and stably.

In a case where the bearing mechanism includes the first bearing mechanism, as shown in FIGS. 7 and 9, the first bearing mechanism includes a swing member 10. A first end 11 of the swing member 10 is hinged with the first body 1, and a second end 12 of the swing member 10 is hinged with the second body 2 and rotates on the support plane around a hinge point of the first end 11. A hinge member hinged between the second end 12 and the second body 2 is the first connection member 7, and an arc trajectory formed by rotation of the second end 12 coincides with the first strip hole 4, so that the swing member 10 can push the second body 2 to have a displacement in the direction of gravity through the second end 12 during swinging. In this structure, a center of circle when the swing member 10 swings is the hinge point of the first end 11, and the first connection member 7 at the second end 12 rotates around the hinge point of the first end 11 when swinging (i.e., when moving within the first strip hole 4). When the second body 2 is in the landscape orientation, as shown in FIG. 7, the second end 12 of the swing member 10 is located at a right end of the first strip hole 4. During the transformation of the second body 2 to the portrait orientation, as shown by an arrow in FIG. 7, the second end 12 and the first connection member 7 at the second end 12 (in order to ensure a smooth rotation of the first connection member 7, a plurality of gaskets 26 are provided at connection position of the first connection member 7 and the swing member 10, as shown in FIG. 9) move from the right end to a left end of the first strip hole 4. Since the heights of the two ends of the first strip hole 4 are smaller than the height of the middle, during this movement, the second end 12 and the first connection member 7 will have a displacement in the direction of gravity (the direction of gravity is a vertical direction in a viewing angle of FIG. 7), that is, the first connection member 7 will rise first and then fall when moving within the first strip hole 4. Since the first connection member 7 is connected to the second body 2, the rotating second body 2 will also rise first and then fall. Also, since the first connection member 7 is provided at the second end 12 of the swing member 10, the swing member 10 will push the second body 2 to rise when the second body 2 rises. That is, the gravity of the second body 2 will act on the swing member 10, which prevents the gravity of the second body 2 from acting on edge of the first strip hole 4, so that the first connection member 7 can move more smoothly within the first strip hole 4. With the bearing mechanism of this structure, a support member is a rigid member that can bear a large force (such as gravity), which can fully bear the gravity of the second body 2 and can strongly drive the rise and fall of the second body 2, so as to bear the gravity of the second body 2 to a maximum extent.

In a case where the bearing mechanism includes the second bearing mechanism: as shown in FIGS. 8 and 9, the second bearing mechanism includes a sliding rail 13 arranged on the support plane, a sliding member 14 slidably arranged at the sliding rail 13, and a first elastic member 15 (such as a tension spring) arranged at the first body 1 and connected with the sliding member 14. The sliding rail 13 is arranged along the direction of gravity of the second body 2. The sliding member 14 is connected to the second body 2 and moves synchronously with the second body 2. A sliding trajectory of the sliding member 14 coincides with the third strip hole 6, and a connection member connecting the sliding member 14 and the second body 2 is the third connection member 9. Direction of a tension force exerted by the first elastic member 15 is opposite to the direction of gravity of the second body 2. In this structure, the third connection member 9 is moved and matched with the third strip hole 6, and meanwhile, the third connection member 9 is also connected to the sliding member 14 slidably arranged at the sliding rail 13 (in order to ensure a smooth rotation of the third connection member 9, a plurality of gaskets 26 are also provided at connection position of the third connection member 9 and the sliding member 14, as shown in FIG. 9). Also, the sliding member 14 is also connected with the first elastic member 15. During the rotation of the second body 2, the second body 2 drives the third connection member 9 to rise or fall within the third strip hole 6. Since the first elastic member 15 can apply a tension force to the third connection member 9 through the sliding member 14, the second bearing mechanism can assist the second body 2 to rise by applying tension force to the second body 2 during the rotation of the second body 2, so as to bear the gravity of the second body 2. With the bearing mechanism of this structure, the second body 2 is pulled by the first elastic member 15, so the tension force applied to the second body 2 is soft, which can greatly improve the rotation stability of the second body 2.

In some embodiments of the present disclosure, the bearing mechanism can include both the first bearing mechanism and the second bearing mechanism that play different roles. The first bearing mechanism has higher rigidity, can bear larger gravity, and can better drive the second body 2, so the first bearing mechanism is the main bearing mechanism that bears the gravity of the second body 2. The second bearing mechanism can apply a softer tension force to the second body 2, so it can be used to improve hand feel when the user rotates the second body 2, so that the user has a better operation experience.

In the electronic device described above, as shown in FIGS. 14-17, the connection device 3 and/or the second body 2 are also provided with a positioning mechanism, which can prevent and allow relative rotation between the second body 2 and the first body 1 by extending and retracting. As described above, the second body 2 can be rotated relative to the first body 1 to switch between the landscape and portrait orientations. If there is no relative positioning between the second body 2 and the first body 1, when the electronic device is placed on the desktop or the user is moving the electronic device, it is possible that the second body 2 unexpectedly rotates relative to the first body 1, which may affect the moving of the electronic device. Also, the second body 2 needs to be restored to its original state after the moving is completed, which is inconvenient to the user. Therefore, in order to avoid this situation, the electronic device also includes the positioning mechanism configured to position the second body 2 at the first body 1. When the positioning mechanism is extended to position the second body 2, no matter the electronic device is in use or in the moving, the second body 2 cannot be rotated relative to the first body 1, that is, the orientation of the electronic device cannot be changed, so as to ensure that the electronic device maintains a fixed orientation during operating and moving. When the user needs to change the orientation of the electronic device, such as changing from the landscape orientation to the portrait orientation or from the portrait orientation to the landscape orientation, the positioning mechanism is retracted to release the positioning, and at this time, the user can rotate the second body 2 to make it rotates relative to the first body 1 to change the orientation. By adding the positioning mechanism, working reliability of the electronic device is improved, and the user can have a better user experience.

In some embodiments, as shown in FIGS. 9 and 14-17, the first body 1 includes the support plate 24, and the support plane is a surface of the support plate 24. The connection device 3 includes a connection mechanism and a housing 16, and the connection mechanism is arranged within a space enclosed by the housing 16 and the support plate 24. The positioning mechanism includes: a slot opened at the second body 2, a lock member 17 provided on the support plate 24, a second elastic member 18 that drives the lock member 17 to extend to make the lock member 17 extending into the slot, an operation member 20 slidably arranged at surface of the housing 16, and a transmission member 21 slidably arranged within the housing 16. The lock member 17 can be extended to outside the housing 16 and can be retracted to inside of the housing 16. One end of the transmission member 21 is fixedly connected with the operation member 20, and can move in a direction parallel to the support plate 24 driven by the operation member 20. Another end of the transmission member 21 has a bevel 27 slidably matched with the lock member 17, so that the moving transmission member 21 can drive the lock member 17 to move in a retraction direction. In this structure, the structure of the first body 1 is refined. When the first body 1 is the computing device described above, it has a rectangular shape as shown in FIGS. 1-6. The support plate 24 is a component of a housing of the computing device, and the support plane is an outer surface of the housing of the computing device. Meanwhile, the connection device 3 is also defined as two parts, one is the housing 16, and the other is the connection mechanism. The housing 16 and the support plate 24 enclose an accommodating space, and the connection mechanism is an executing mechanism that realizes rotational connection between the second body 2 and the first body 1, i.e., structures such as the connection members and the strip holes described above. The connection mechanism is located within the accommodating space. The specific structure of the positioning mechanism will be described below on this basis. A rod-shaped lock member 17 is a member configured to lock the second body 2, and the second body 2 is provided with a slot. When the lock member 17 extends into the slot, the lock member 17 can lock the second body 2. A support surface of the support plate 24 is convexly provided with a tubular mounting member 19, and the lock member 17 is telescopically arranged in an inner cavity of the mounting member 19. The lock member 17 can be extended out of the housing 16 of the connection device 3 to enter the slot through extension and retraction, and can be retracted back into the housing 16 to move out of the slot. In the meanwhile, the inner cavity of the mounting member 19 is also provided with a second elastic member 18 (for example, a spring), which is also sleeved on the lock member 17 while being arranged inside the mounting member 19. The second elastic member 18 applies an elastic force to the lock member 17, so that the lock member 17 always has a tendency to move (i.e., extend) to outside the housing 16. When the lock member 17 is aligned with the slot, the lock member 17 can extend into the slot with the drive of the second elastic member 18, so as to realize automatic locking. An operation member 20 is provided at the outer surface of the housing 16, which is a component that the user applies force to operate the positioning mechanism and is slidably arranged at the housing 16. When the user needs to release the positioning, the operation member 20 can be forced to move at the housing 16 to drive the lock member 17 to retract. A transmission between the operation member 20 and the lock member 17 is realized by a transmission member 21 that is slidably arranged within the housing 16. One end of the transmission member 21 is fixedly connected to the operation member 20, and after the transmission member 21 is connected to the operation member 20, the transmission member 21 can move in a direction parallel to the support member with the drive of the operation member 20, that is, move in a direction perpendicular to the extension and retraction of the lock member 17. Another end of the transmission member 21 has a bevel 27 that can be slidably matched with the lock member 17. When the transmission member 21 moves in a direction perpendicular to the extension and retraction, the bevel 27 and the lock member 17 are slidably matched so that the lock member 17 can be retracted with the drive of the transmission member 21 (the extension of the lock member 17 is automatically realized by the elastic force applied by the second elastic member 18, so an extension operation does not require the drive of operation member 20 and the transmission member 21) and moved out of the slot, thereby releasing the positioning between the first body 1 and the second body 2.

In addition, in the positioning mechanism described above, as shown in FIG. 17, the operation member 20 is located outside the housing 16 of the connection device 3, that is, the operation member 20 is a component exposed on an outer surface of the electronic device. In order to facilitate the user to perform an unlock operation, in some embodiments, the operation member 20 is arranged at a top surface of the housing 16 of the connection device 3. In the meanwhile, since the connection device 3 is respectively blocked by the second body 2 and the first body 1 in front and rear direction of the electronic device, such arrangement of the operation member 20 can also reduce its impact on the appearance of the electronic device.

Figure 16:
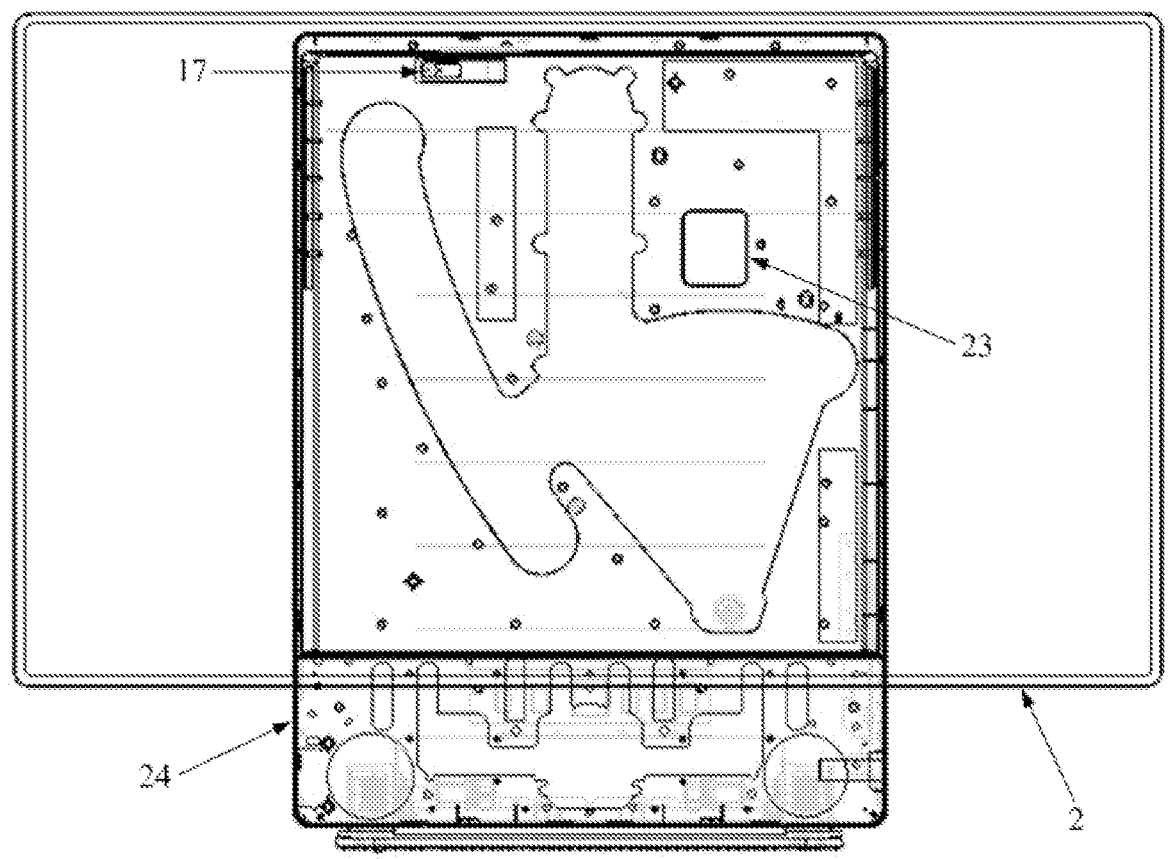
FIG. 16 is a schematic structural diagram showing position setting of a positioning mechanism.
Figure 17:
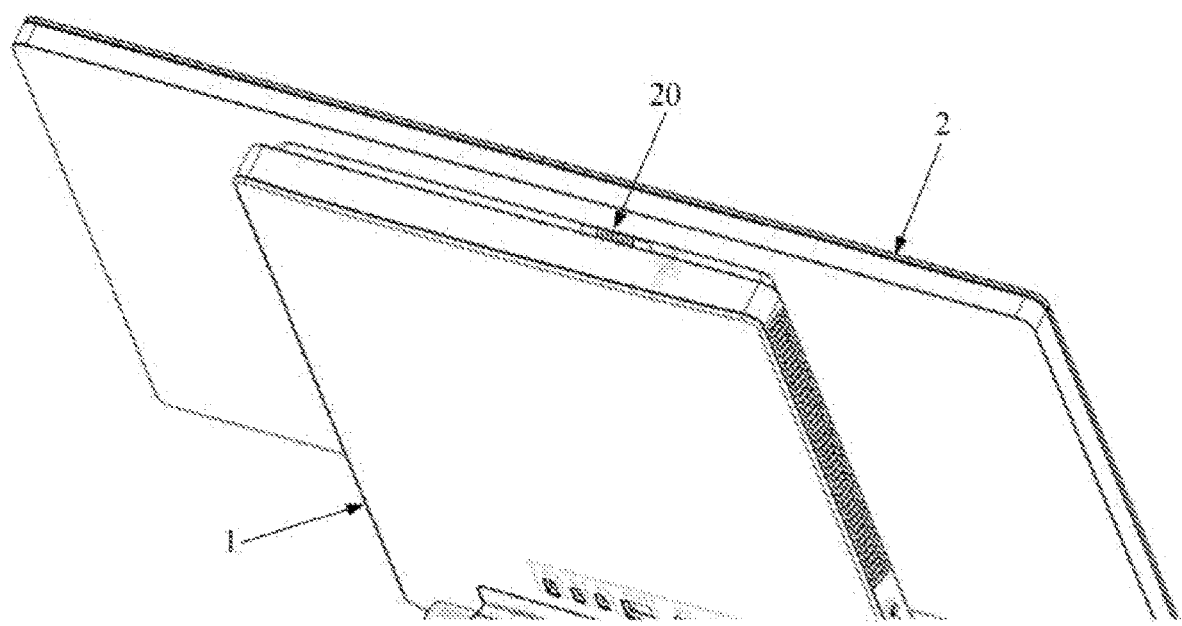
FIG. 17 is a schematic structural diagram showing position setting of an operation member.
Figure 18:
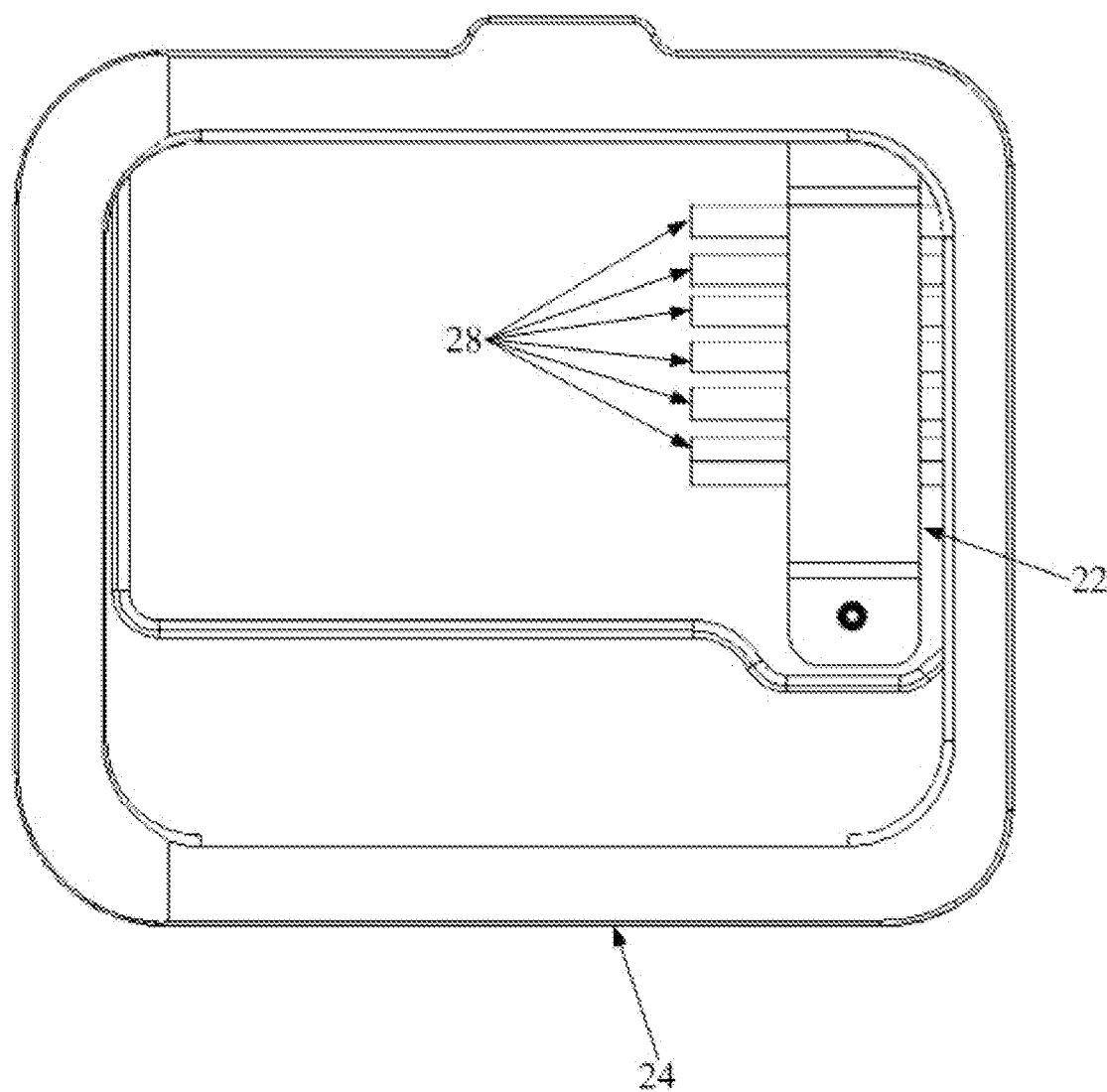
FIG. 18 is a top view of a cable management assembly.
Figure 19:
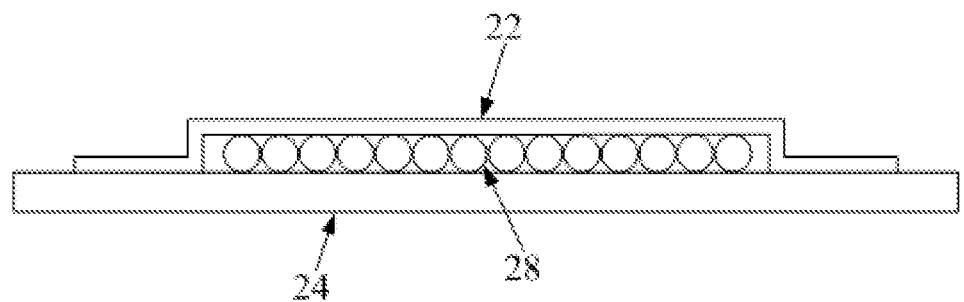
FIG. 19 is a front view of a cable management assembly.

In the present disclosure, wires 28 that realize electrical coupling between the second body 2 and the first body 1 are also made to be routed within the connection device 3, and the connection device 3 is provided with a wire management structure, as shown in FIGS. 18 and 19. The wire management structure includes a wire assembly arranged on the support plate 24 of the first body 1, and a threading port 23 on the support plate 24 and allows the wires 28 to be drawn from the connection device 3, as shown in FIG. 16. The wire assembly forms a wiring channel that can fix a plurality of wires 28 and make the plurality of wires 28 evenly and parallelly distributed. When the electronic device is a computer, the first body 1 is the computing device of the electronic device, and the second body 2 is the display device of the electronic device, to realize the electrical coupling between the first body 1 and the second body 2, it is needed to connect the wires 28 between the first body 1 and the second body 2. Also, since the connection device 3 is located between the first body 1 and the second body 2, the wires 28 are housed within the housing 16 of the connection device 3, that is, wiring is implemented inside the connection device 3, so that the wires 28 can be prevented from being exposed outside the electronic device, which makes the appearance of the electronic device tidier. In addition, in order to make the wires 28 arranged inside the connection device 3 more standardized, so that they will not interfere with normal operation of other parts of the connection device 3, the wire management structure is provided within the connection device 3, as shown in FIGS. 18 and 19. The wire assembly of the wire management structure includes a wire member 22 arranged on the support plate 24. The wire member 22 is a trough-shaped member, which forms the wiring channel with the support plate 24. When passing through the wiring channel, the plurality of wires 28 need to be laid in parallel on the support plate 24. The wire member 22 can also compress the wires 28 to better constrain the wires 28, and the straightened wires 28 coming out of the wiring channel pass through the threading port 23 to enter the first body 1 from the connection device 3.

In some embodiments of the present disclosure, the electronic device is an all-in-one computer. The first body 1 includes the support member at which the host device of the computer is arranged, and the second body 2 is the display device of the computer. In this electronic device, the first body 1 can directly be the host device of the computer (i.e., the structure described above), or the first body 1 can include multiple parts, i.e., the support structure and the host device. The support structure is a special bracket structure, which includes a base 25 and the support member (such as a plate support member) standing on the base 25. Also, the host device is arranged at a side of the support member close to the second body 2, then the connection device 3 is arranged at a side of the host device close to the second body 2, and finally the second body 2 is arranged at the connection device 3. In some embodiments of the present disclosure, the host device is directly used as the support member to simplify the structure, that is, the first body 1 includes the host device and the base 25, as shown in FIGS. 1-6.

The structure of each part is described in a progressive manner in this specification, and the description of the structure of each part focuses on the difference from the existing structure. An entire and part of the structure of the electronic device can be obtained by combining the structures of the multiple parts described above.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure are not limited to the embodiments shown herein, but should conform to the widest scope consistent with the principles and novel features disclosed herein.

What is claimed is:

1. An electronic device comprising: a first body including a support plane and a support plate, the support plane is a surface of the support plate; a second body; a connection device arranged at the support plane and configured to connect the first body and the second body, the connection device including a connection mechanism and a housing, the connection mechanism being arranged within a space enclosed by the housing and the support plate; a positioning mechanism including, a slot opened at the second body; a lock member provided on the support plate; a second elastic member that drives the lock member to extend to make the lock member extending into the slot; an operation member slidably arranged at surface of the housing; and a transmission member slidably arranged within the housing, wherein the lock member is extended to outside the housing and is retracted to inside the housing, one end of the transmission member is fixedly connected with the operation member and moves in a direction parallel to the support plate driven by the operation member, and another end of the transmission member has a bevel slidably matched with the lock member, the moving transmission member driving the lock member to move in a retraction direction in order to allow relative rotation between the second body and the first body; and a bearing mechanism arranged at the first body, wherein: the connection device includes a plurality of connection members between the first body and the second body, and the second body rotates on the support plane through movements and rotations of the connection members in a plurality of slideways located on the support plane; and the bearing mechanism is connected with the connection members and drives the connection members to move on the support plane to bear gravity of the second body.

2. The electronic device of claim 1, wherein:
the second body is rotatably arranged at the first body through the connection device arranged between the first body and the second body; and the connection device is blocked by the first body in a first direction and is blocked by the second body in a second direction, the first direction and the second direction being opposite directions.

3. The electronic device of claim 1, wherein:

the bearing mechanism includes at least one of a first bearing mechanism and a second bearing mechanism;

the first bearing mechanism is a swing mechanism that drives the connection member to swing by swinging on the support plane, and the swing connection member has a displacement in direction of gravity; and the second bearing mechanism is a sliding mechanism that drives the connection member to rise and fall in the direction of gravity by sliding on the support plane.

4. The electronic device of claim 3, wherein:

in a case where the bearing mechanism includes the first bearing mechanism, the first bearing mechanism includes a swing member, a first end of the swing member being hinged with the first body, and a second end of the swing member being hinged with the second body and rotates on the support plane around a hinge point of the first end, a hinge member hinged between the second end and the second body is a first connection member, and an arc trajectory formed by rotation of the second end coincides with a first strip hole, the swing member pushing the second body to have a displacement in the direction of gravity through the second end during a swinging motion; and in a case where the bearing mechanism includes the second bearing mechanism, the second bearing mechanism includes a sliding rail arranged on the support plane, a sliding member slidably arranged at the sliding rail, and a first elastic member arranged at the first body and connected with the sliding member, the sliding rail being arranged along the direction of gravity of the second body, the sliding member being connected to the second body and moving synchronously with the second body, a sliding trajectory of the sliding member coinciding with a third strip hole, a connection member connecting the sliding member and the second body being a third connection member, and direction of a tension force exerted by the first elastic member is opposite to the direction of gravity of the second body.

5. The electronic device of claim 1, wherein the connection device includes the plurality of the slideways and the plurality of the connection members, both numbers of the slideways and the connection members being not less than three, and the connection members and the slideways having one-to-one correspondence.

6. The electronic device of claim 5, wherein:

the slideways are strip holes on the support plane including a first strip hole, a second strip hole, and a third strip hole;

the connection member includes a first connection member, a second connection member, and a third connection member that are respectively rotatably and movably arranged within the first strip hole, the second strip hole, and the third strip hole;

the first strip hole and the second strip hole are both arc holes with arc extension trajectory and extend in different directions on the support plane, and the extension trajectory of the first strip hole is a convex arc in opposite direction of gravity; and the third strip hole is a straight hole with a straight extension trajectory and is located between the first strip hole and the second strip hole.

7. The electronic device of claim 1, wherein:

wires that enable electrical coupling between the second body and the first body are routed within the connection device; and the connection device is provided with a wire management structure including:

a wire assembly arranged on a support plate of the first body and forming a wiring channel that fixes a plurality of wires and makes the plurality of wires evenly and parallelly distributed; and a threading port on the support plate allowing the wires to be drawn from the connection device.

8. The electronic device of claim 2, wherein the electronic device is an all-in-one computer, the first body includes a support member at which a host device of the computer is arranged, and the second body is a display device of the computer the connection device includes the plurality of connection members between the first body and the second body, and the second body rotates on the support plane through movements and rotations of the connection members in the plurality of slideways located on the support plane.

* * * * *